US006889993B2

(12) United States Patent
Chen et al.

(10) Patent No.: US 6,889,993 B2
(45) Date of Patent: May 10, 2005

(54) WHEELCHAIR HAVING FOLDABLE BACKREST MODULE AND SEAT MODULE

(75) Inventors: Zen-Jye Chen, Taichung (TW); Wen-Huei Chung, Taichung (TW); Shsu-Tung Chu, Taichung (TW); Chi-Ming Shih, Taichung (TW); Ju-Pin Li, Taichung (TW)

(73) Assignee: Aerospace Industrial Development Corporation, Taichung (TW)

( * ) Notice: Subject to any disclaimer, the term of this patent is extended or adjusted under 35 U.S.C. 154(b) by 0 days.

(21) Appl. No.: 10/205,442

(22) Filed: Jul. 26, 2002

(65) Prior Publication Data

US 2003/0189306 A1 Oct. 9, 2003

(30) Foreign Application Priority Data

Apr. 3, 2002 (TW) ..................................... 91204457 U

(51) Int. Cl.[7] ................................................ B62M 1/14

(52) U.S. Cl. .................... 280/287; 280/220; 280/226.1; 280/250.1; 280/304.1; 297/DIG. 4

(58) Field of Search ............................. 280/304.1, 220, 280/226.1, 250.1, 287; 297/DIG. 4

(56) References Cited

U.S. PATENT DOCUMENTS 4,273,350 A * 6/1981 Williams ................. 280/250.1
4,405,142 A * 9/1983 Whetstine ................ 280/250.1
5,062,677 A * 11/1991 Jay et al. ................. 297/440.2
5,101,811 A * 4/1992 Brunswick ............... 297/284.4
5,509,673 A * 4/1996 Wu et al. ................ 280/250.1
6,048,031 A * 4/2000 Warhaftig .............. 297/354.12
6,126,186 A * 10/2000 Mascari ...................... 280/220
6,257,664 B1 * 7/2001 Chew et al. ............. 297/284.9
6,431,650 B1 * 8/2002 Visone ........................ 297/339
6,454,285 B1 * 9/2002 Koenig ..................... 280/250.1
6,499,762 B1 * 12/2002 Rogers et al. .............. 280/650

* cited by examiner

*Primary Examiner*—Lesley D. Morris
*Assistant Examiner*—Matt Luby
(74) *Attorney, Agent, or Firm*—Rosenberg, Klein & Lee

(57) ABSTRACT

A wheelchair includes a seat frame having two transverse support rods, a foldable sunk-type seat module mounted on the seat frame and located between the two transverse support rods, a backrest frame having two upright support rods, and a foldable sunk-type backrest module mounted on the backrest frame and located between the two upright support rods. Thus, the backrest module may be mounted on and detached from the upright support rods of the backrest frame easily, rapidly and conveniently, and the seat module may be mounted on and detached from the horizontal support rods of the seat frame easily, rapidly and conveniently.

6 Claims, 6 Drawing Sheets

WHEELCHAIR HAVING FOLDABLE BACKREST MODULE AND SEAT MODULE

BACKGROUND OF THE INVENTION

1. Field of the Invention

The present invention relates to a wheelchair having a foldable backrest module and a foldable seat module, and more particularly to a wheelchair having a foldable backrest module and a foldable seat module which may be assembled and disassembled easily and conveniently.

2. Description of the Related Art

A conventional wheelchair comprises a seat frame, a rigid seat plate mounted on the seat frame for supporting a soft seat, a backrest frame, and a rigid backrest plate mounted on the backrest frame for supporting a soft backrest. However, the rigid seat plate is directly-fixed on the seat frame, and the rigid backrest plate is also directly fixed on the backrest frame, so that the conventional wheelchair cannot be folded when not in use, thereby occupying a large space, and thereby decreasing the versatility of the conventional wheelchair.

SUMMARY OF THE INVENTION

The present invention has arisen to mitigate and/or obviate the disadvantage of the conventional wheelchair.

The primary objective of the present invention is to provide a wheelchair having a foldable backrest module and a foldable seat module which may be assembled and disassembled easily and conveniently.

Another objective of the present invention is to provide a wheelchair having a foldable backrest module and a foldable seat module, wherein the backrest module may be mounted on and detached from the upright support rods of the backrest frame easily, rapidly and conveniently, and the seat module may be mounted on and detached from the horizontal support rods of the seat frame easily, rapidly and conveniently.

A further objective of the present invention is to provide a wheelchair having a foldable backrest module and a foldable seat module, wherein the backrest module may be mounted on the backrest frame in a sunk manner, and may be retained by the upright support rods of the backrest frame, while the seat module may be mounted on the seat frame in a sunk manner, and may be retained by the horizontal support rods of the seat frame, so that the backrest and the seat may be positioned stably and rigidly, thereby satisfying the requirement of a high stability.

In accordance with the present invention, there is provided a wheelchair, comprising a seat frame having two transverse support rods, a foldable sunk-type seat module mounted on the seat frame and located between the two transverse support rods, a backrest frame having two upright support rods, and a foldable sunk-type backrest module mounted on the backrest frame and located between the two upright support rods.

Further benefits and advantages of the present invention will become apparent after a careful reading of the detailed description with appropriate reference to the accompanying drawings.

DETAILED DESCRIPTION OF THE INVENTION

Figure 1:
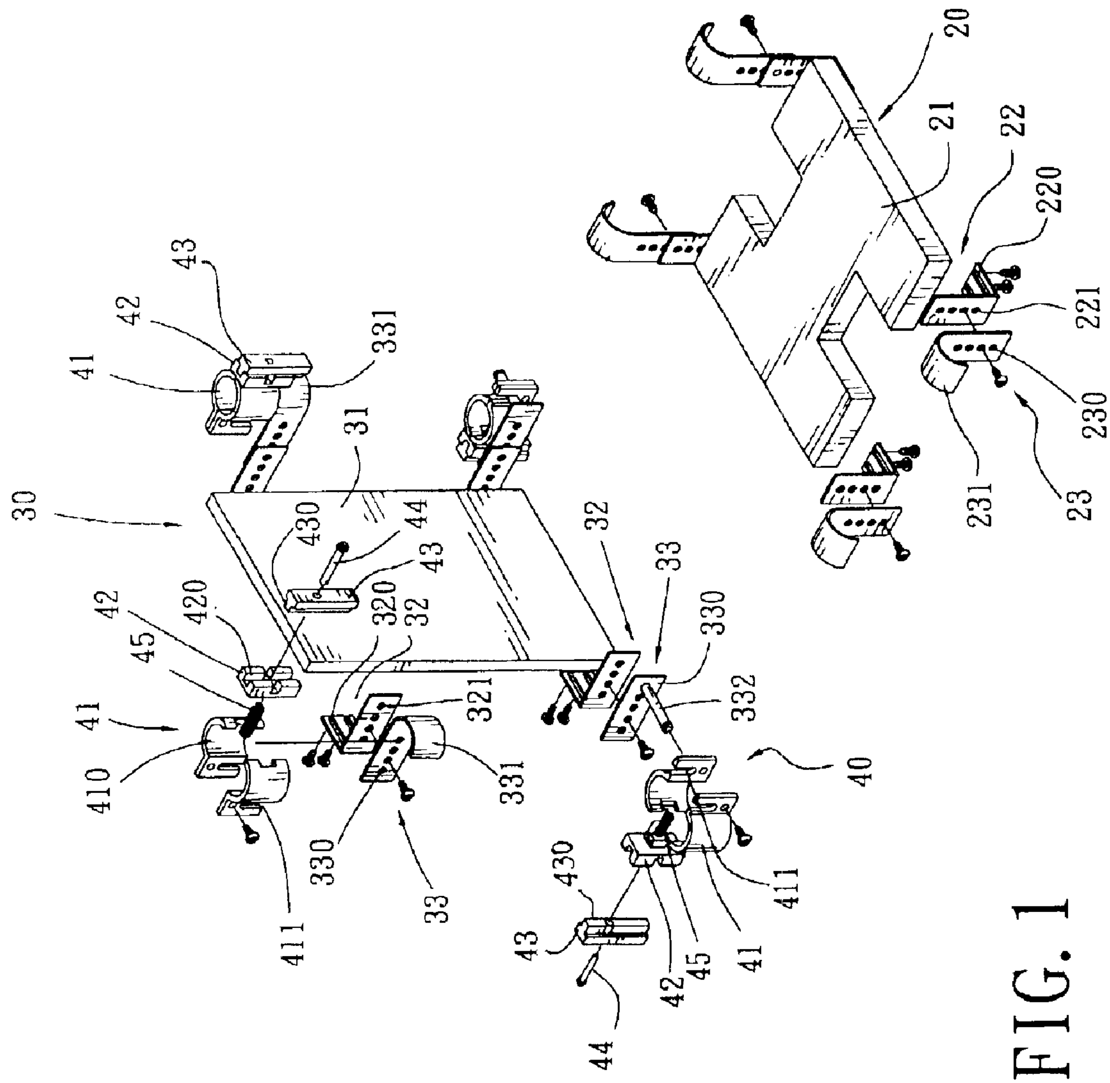
FIG. 1 is a partially exploded perspective view of a wheelchair having a foldable backrest module and a foldable seat module in accordance with a first embodiment of the present invention.
Figure 2:
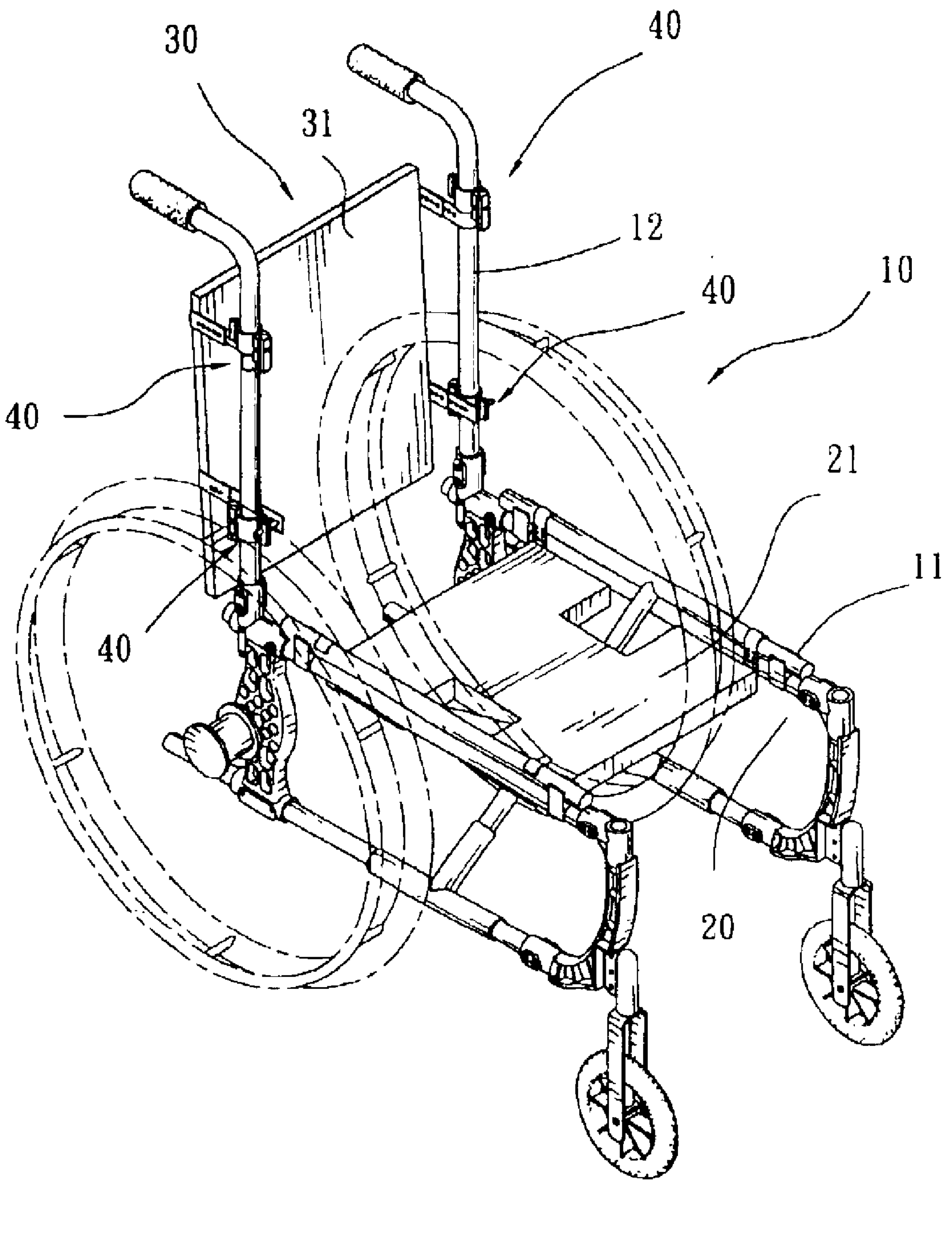
FIG. 2 is a perspective assembly view of the wheelchair having a foldable backrest module and a foldable seat module in accordance with the first embodiment of the present invention.

Referring to the drawings and initially to FIGS. 1 and 2, a wheelchair 10 having a foldable backrest module and a foldable seat module in accordance with a first embodiment of the present invention comprises a seat frame having two transverse support rods 1, a foldable sunk-type seat module 20 mounted on the seat frame and located between the two transverse support rods 11, a backrest frame having two upright support rods 12, and a foldable sunk-type backrest module 30 mounted on the backrest frame and located between the two upright support rods 12.

The seat module 20 includes a rigid seat plate 21 for supporting a seat (not shown). The seat plate 21 of the seat module 20 has four corners each provided with a combination body 22, and a mating positioning body 23.

The combination body 22 of the seat module 20 is substantially L-shaped, and has a first section formed with a slotted fixing portion 220 secured on a bottom of each of the four corners of the seat plate 21 of the seat module 20 by screws, and a second section formed with a combination portion 221 which is formed with multiple adjusting holes.

The positioning body 23 of the seat module 20 has a flat section formed with a combination portion 230 secured on the combination portion 221 of the combination body 22 of the seat module 20 by screws and nuts. The combination portion 230 of the positioning body 23 of the seat module 20 is formed with multiple adjusting holes aligning with the multiple adjusting holes the combination portion 221 of the combination body 22 of the seat module 20. The combination portion 230 of the positioning body 23 of the seat module 20 has a distal end formed with a hook-shaped positioning portion 231 that may be hooked on the transverse support rod 11 of the seat frame.

The backrest module 30 includes a rigid backrest plate 31 for supporting a backrest (not shown). The backrest plate 31 of the backrest module 30 has four corners each provided with a combination body 32, and a mating positioning body 33.

The combination body 32 of the backrest module 30 is substantially L-shaped, and has a first section formed with a slotted fixing portion 320 secured on a bottom of each of the four corners of the backrest plate 31 of the backrest module 30 by screws, and a second section formed with a combination portion 321 which is formed with multiple adjusting holes.

The positioning body 33 of the backrest module 30 has a flat section formed with a combination portion 330 secured on the combination portion 321 of the combination body 32 of the backrest module 30 by screws and nuts. The combination portion 330 of the positioning body 33 of the backrest module 30 is formed with multiple adjusting holes aligning with the multiple adjusting holes the combination portion 321 of the combination body 32 of the backrest module 30. The combination portion 330 of the positioning body 33 of the backrest module 30 at each of the two upper corners of the backrest plate 31 of the backrest module 30 has a distal end formed with a hook-shaped positioning portion 331 that may be hooked on the upright support rod 12 of the backrest frame. The combination portion 330 of the positioning body 33 of the backrest module 30 at each of the two lower corners of the backrest plate 31 of the backrest module 30 has a distal end provided with an insertion rod 332.

The wheelchair 10 further comprises four positioning devices 40 each secured on the backrest frame and each located at each of the four corners of the backrest plate 31 of the backrest module 30.

Each of the four positioning devices 40 is secured on one of the two upright support rods 12 of the backrest frame, and includes two clamping members 41 combined with each other for clamping the upright support rod 12 of the backrest frame. Each of the two clamping members 41 of each of the four positioning devices 40 is formed with an arcuate clamping portion 410 for clamping the upright support rod 12 of the backrest frame. Each of the two clamping members 41 of each of the four positioning devices 40 has a first end provided with a hook-shaped receiving portion 411, and a second end secured with a first side of a locking body 42 whose second side is formed with a cross-shaped locking groove 420 for locking a retaining body 43 which is provided with a protruding locking rib 430 that may be locked in the cross-shaped locking groove 420 of the locking body 42. The locking rib 430 of the retaining body 43 has two ends each protruding outward from the locking body 42.

A guide pin 44 is in turn extended through the retaining body 43, the locking body 42, and an elastic member 45, thereby combining the retaining body 43, the locking body 42, and the elastic member 45. The elastic member 45 has a first end secured on a distal end of the guide pin 44 and a second end urged on the first side of the locking body 42, so that the retaining body 43 may be pulled to move outward relative to the locking body 42 to compress the elastic member 45, and may be push to move toward the locking body 42 by the restoring force of the elastic member 45.

Figure 3:
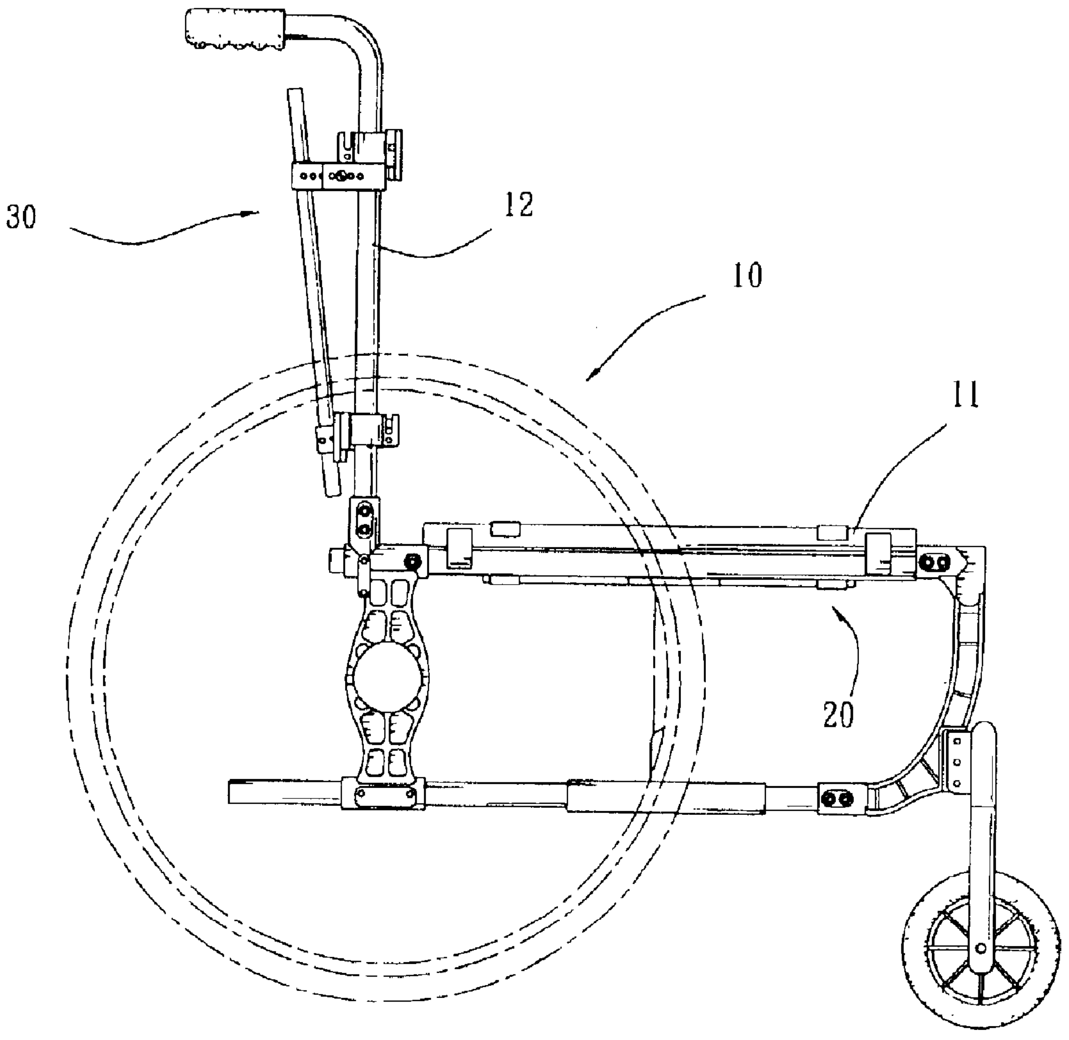
FIG. 3 is a side plan view of the wheelchair having a foldable backrest module and a foldable seat module as shown in FIG. 2.

In assembly, referring to FIGS. 1–3, each of the four positioning devices 40 is secured on one of the two upright support rods 12 of the backrest frame as shown in FIG. 2. At the same time, the two upper positioning devices 40 are arranged at the normal state with the hook-shaped receiving portion 411 facing downward, and the two lower positioning devices 40 are arranged at the inverted state with the hook-shaped receiving portion 411 facing upward as shown in FIG. 1. Then, the insertion rod 332 of the combination portion 330 of the positioning body 33 of the backrest module 30 at each of the two lower corners of the backrest plate 31 of the backrest module 30 may be directly inserted into the hook-shaped receiving portion 411 of each of the two lower positioning devices 40, thereby positioning the two lower corners of the backrest plate 31 of the backrest module 30. Then, the retaining body 43 of each of the two upper positioning devices 40 may be pulled to move outward relative to the locking body 42 to detach from the cross-shaped locking groove 420 of the locking body 42, and may be rotated from a vertical state into a horizontal state. Then, the upper portion of the backrest plate 31 of the backrest module 30 may be pushed to move toward the two upright support rods 12 of the backrest frame, so that the hook-shaped positioning portion 331 of the combination portion 330 of the positioning body 33 of the backrest module 30 at each of the two upper corners of the backrest plate 31 of the backrest module 30 may be exactly rested on the upright support rod 12 of the backrest frame. Then, the retaining body 43 of each of the two upper positioning devices 40 may be pulled to move outward relative to the locking body 42 to detach from the cross-shaped locking groove 420 of the locking body 42, and may be rotated from a horizontal state into a vertical state as shown in FIG. 1, thereby retaining the hook-shaped positioning portion 331 of the combination portion 330 of the positioning body 33 of the backrest module 30 on the upright support rod 12 of the backrest frame. In such a manner, the backrest module 30 may be mounted on the upright support rods 12 of the backrest frame.

On the contrary, the retaining body 43 of each of the two upper positioning devices 40 may be pulled to move outward relative to the locking body 42 to detach from the cross-shaped locking groove 420 of the locking body 42, and may be rotated from a vertical state into a horizontal state, so that the hook-shaped positioning portion 331 of the combination portion 330 of the positioning body 33 of the backrest module 30 may be detached from the upright support rod 12 of the backrest frame. Then, the insertion, rod 332 of the combination portion 330 of the positioning body 33 of the backrest module 30 at each of the two lower corners of the backrest plate 31 of the backrest module 30 may be detached from the hook-shaped receiving portion 411 of each of the two lower positioning devices 40, so that the backrest plate 31 of the backrest module 30 may be detached from the upright support rods 12 of the backrest frame.

Thus, the backrest module 30 may be mounted on and detached from the upright support rods 12 of the backrest frame easily, rapidly and conveniently.

Figure 4:
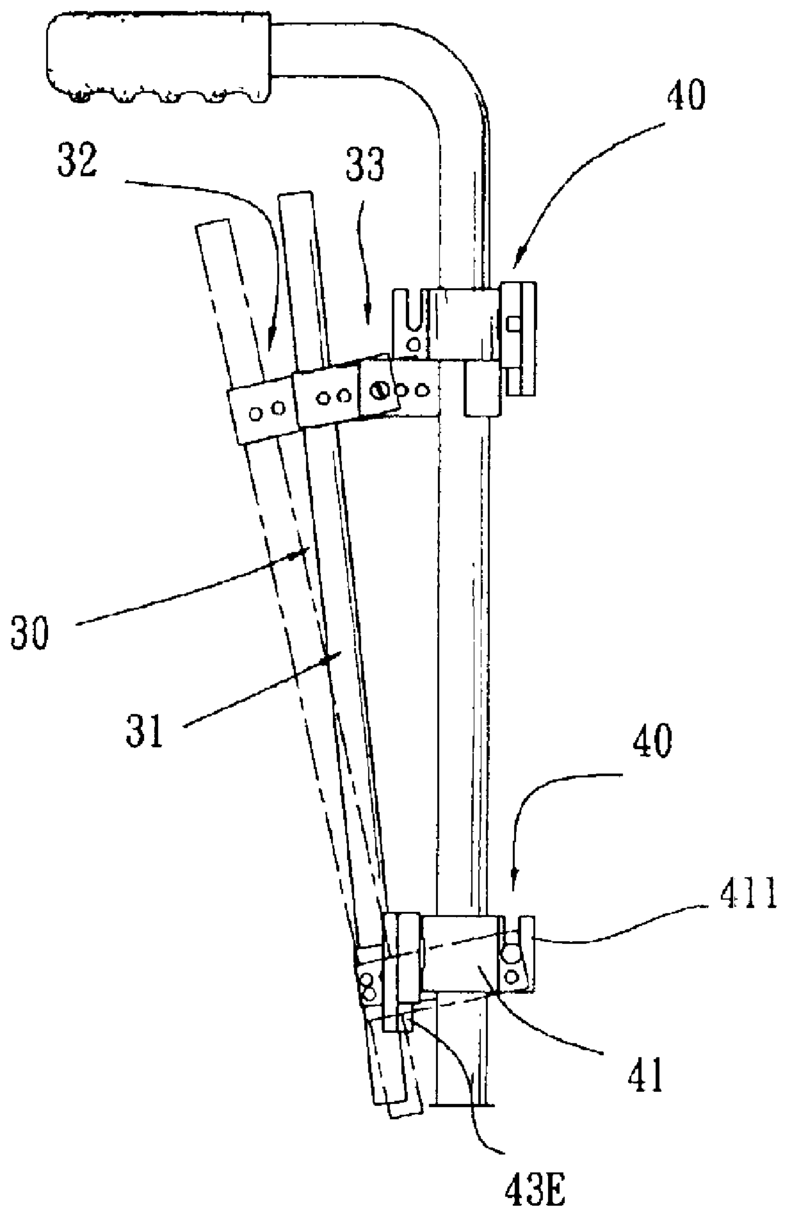
FIG. 4 is a schematic operational view of the wheelchair having a foldable backrest module and a foldable seat module as shown in FIG. 3 in adjustment.

As shown in FIG. 4, the relative position between the combination body 32 and the positioning body 33 of the backrest module 30 may be changed and adjusted, so that the backrest plate 31 of the backrest module 30 may have different inclined angles.

Figure 5:
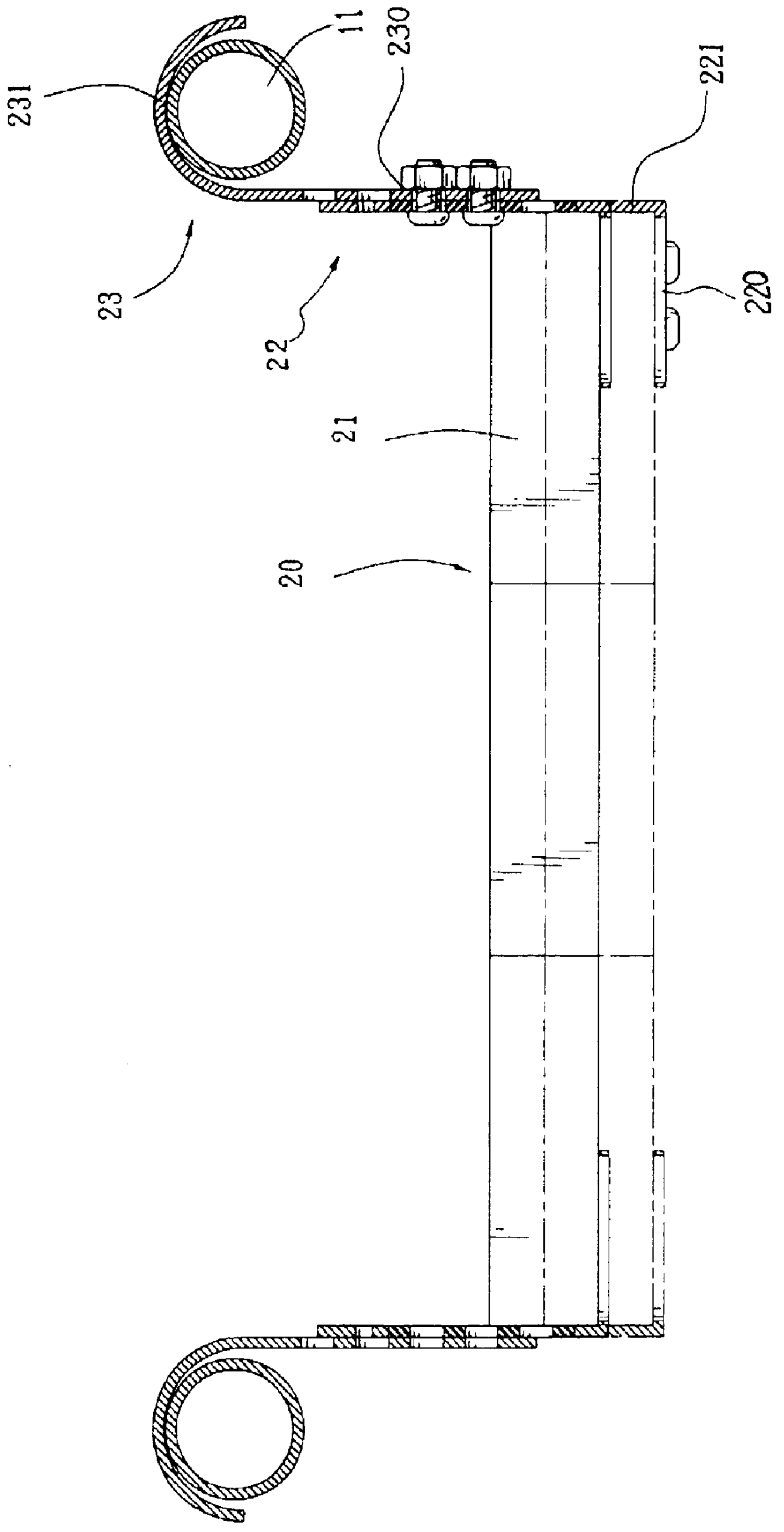
FIG. 5 is a front plan cross-sectional view of the wheelchair having a foldable backrest module and a foldable seat module as shown in FIG. 2.

As shown in FIGS. 2 and 5, the seat module 20 may be directly mounted on the two transverse support rods 11 of the seat frame, with the hook-shaped positioning portion 231 being rested on the transverse support rod 11 of the seat frame. In addition, the relative position between the combination body 22 and the positioning body 23 of the seat module 20 may be changed and adjusted, so that the height of the seat plate 21 of the seat module 20 may be adjusted.

Figure 6:
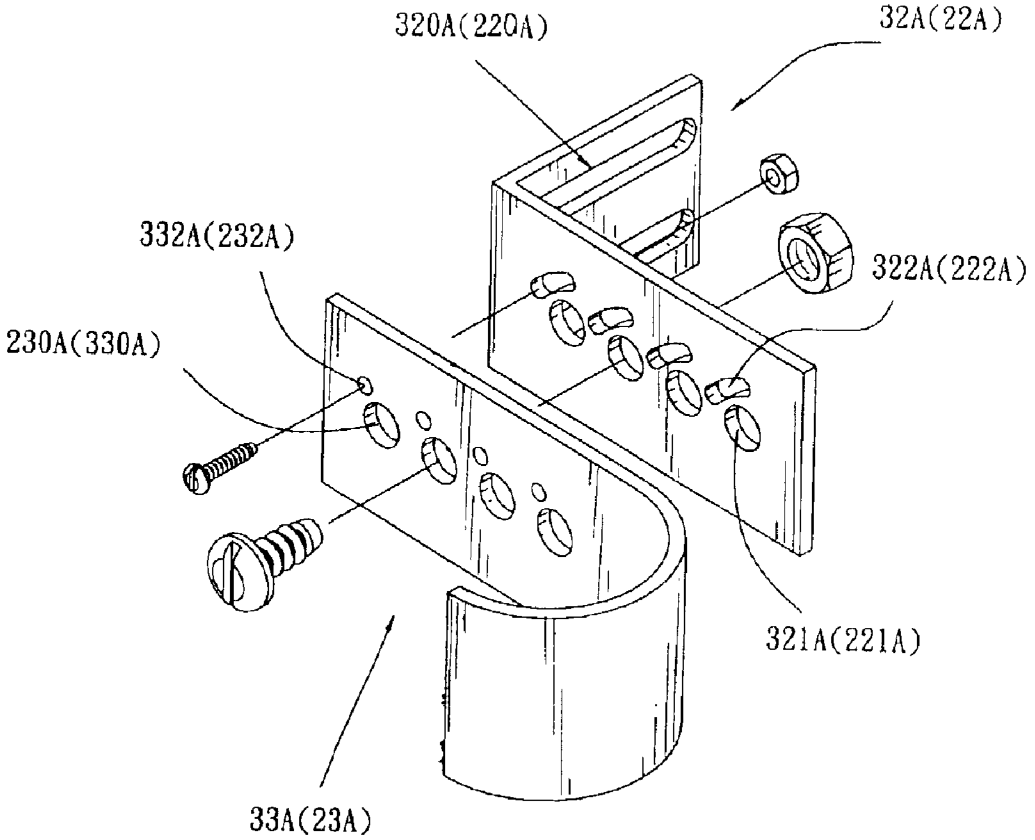
FIG. 6 is a partially exploded perspective view of a wheelchair having a foldable backrest module and a foldable seat module in accordance with a second embodiment of the present invention.

Referring to FIG. 6, a wheelchair having a foldable backrest module and a foldable seat module in accordance with a second embodiment of the present invention is shown. In the backrest module 30, the combination portion 321A of the combination body 32A is formed with multiple first limit portions 322A each having an arcuate slot shape, and the combination portion 330A of the positioning body 33A is formed with multiple second limit portions 332A each having a single hole shape, so that each of the first limit portions 322A of the combination portion 321A of the combination body 32A may be combined with each of the second limit portions 332A of the combination portion 330A of the positioning body 33A by a bolt and a nut. Thus, the relative angle between the combination body 32A and the positioning body 33A may be adjusted, so as to fit the requirement of different assembly angles.

Similarly, in the seat module 20, the combination portion 221A of the combination body 22A is formed with multiple first limit portions 222A each having an arcuate slot shape, and the combination portion 230A of the positioning body 23A is formed with multiple second limit portions 232A each having a single hole shape, so that each of the first limit portions 222A of the combination portion 221A of the combination body 22A may be combined with each of the second limit portions 232A of the combination portion 230A of the positioning body 23A by a bolt and a nut. Thus, the relative angle between the combination body 22A and the positioning body 23A may be adjusted, so as to fit the requirement of different assembly angles.

Accordingly, the wheelchair 10 having a foldable backrest module and a foldable seat module in accordance with the present invention has the following advantages.

1. The backrest module 30 may be mounted on and detached from the upright support rods 12 of the backrest frame easily, rapidly and conveniently, and the seat module 20 may be mounted on and detached from the horizontal support rods 11 of the seat frame easily, rapidly and conveniently.

2. The backrest module 30 may be mounted on the backrest frame in a sunk manner, and may be retained by the upright support rods 12 of the backrest frame, while the seat module 20 may be mounted on the seat frame in a sunk manner, and may be retained by the horizontal support rods 11 of the seat frame, so that the backrest and the seat may be positioned stably and rigidly, thereby satisfying the requirement of a high stability.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A wheelchair comprising a seat frame having two transverse support rods, a sunk-type seat module mounted on the seat frame and located between the two transverse support rods, a backrest frame having two upright support rods, and a sunk-type backrest module mounted on the backrest frame and located between the two upright support rods, the sunk-type seat module including a rigid seat plate having four corners each provided with a combination body and a mating positioning body, the combination body of the seat module having a first section formed with a slotted fixing portion secured on a bottom of a respective one of the four corners of the seat plate of the seat module and a second section formed with a combination portion, the combination portion being formed with a plurality of first adjusting holes, the positioning body of the seat module having a flat section formed with a combination portion secured to the combination portion of the combination body of the seat module, the combination portion of the positioning body of the seat module being formed with a plurality of second adjusting holes, at least one second adjusting hole being selectively aligned with one of the first adjusting holes of the combination portion of the combination body of the seat module, the combination portion of the positioning body of the seat module having a distal end formed with a hook-shaped positioning portion for hooking on the transverse support rod of the seat frame.

2. The wheelchair in accordance with claim 1, wherein the combination portion of the combination body of the seat module being is formed with a plurality of first limit portions each having an arcuate slot shape, and the combination portion of the positioning body being formed with a plurality of second limit portions each being shaped as a hole, whereby at least one of the second limit portions of the combination portion of the positioning body is combined with a corresponding one of the first limit portions of the combination portion of the positioning body.

3. A wheelchair comprising a seat frame having two transverse support rods, a sunk-type seat module mounted on the seat frame and located between the two transverse support rods, a backrest frame having two upright support rods, and a sunk-type backrest module mounted on the backrest frame and located between the two upright support rods, the backrest module including a rigid backrest plate having four corners each provided with a combination body and a mating positioning body, the combination body of the backrest module having a first section formed with a slotted fixing portion secured on a bottom of a respective one of the four corners of the backrest plate of the backrest module and a second section formed with a combination portion, the combination portion being formed with a plurality of first adjusting holes, the positioning body of the backrest module having a flat section formed with a combination portion secured to the combination portion of the combination body of the backrest module, the combination portion of the positioning body of the backrest module being formed with a plurality of second adjusting holes, at least one second adjusting hole being selectively aligned with one of the first adjusting holes of the combination portion of the combination body of the backrest module, the combination portion of the positioning body of the backrest module at each of two upper corners of the backrest plate of the backrest module having a distal end formed with a hook-shaped positioning portion for hooking on the upright support rod of the backrest frame, and the combination portion of the positioning body of the backrest module at each of two lower corners of the backrest plate of the backrest module has a distal end provided with an insertion rod.

4. The wheelchair in accordance with claim 3, wherein the combination portion of the combination body of the backrest module is formed with a plurality of first limit portions each having an arcuate slot shape, and the combination portion of the positioning body being formed with a plurality of second limit portions each being shaped as a hole, whereby at least one of the second limit portions of the combination portion of the positioning body is combined with a corresponding one of the first limit portions of the combination portion of the combination body.

5. A wheelchair comprising (a) a seat frame having two transverse support rods, (b) a sunk-type seat module mounted on the seat frame and located between the two transverse support rods, (c) a backrest frame having two upright support rods, (d) a sunk-type backrest module mounted on the backrest frame and located between the two upright support rods, the backrest module including a backrest plate having four corners, and (e) four positioning devices each secured on the backrest frame and respectively located at each of the four corners of the backrest plate of the backrest module, each of the four positioning devices being secured on one of the two upright support rods of the backrest frame, and includes two clamping members combined with each other for clamping the upright support rod of the backrest frame, each of the two clamping members of each of the four positioning devices being formed with an arcuate clamping portion for clamping the upright support rod of the backrest frame, each of the two clamping members of each of the four positioning devices having a first end provided with a hook-shaped receiving portion and a second end secured with a first side of a locking body, the locking body having a second side is formed with a cross-shaped locking groove for locking a retaining body, the retaining body being provided with a protruding locking rib for being locked in the cross-shaped locking groove of the locking body, the locking rib of the retaining body having two ends respectively protruding outwardly from the locking body, and a guide pin extending through each of the retaining body, the locking body, and an elastic member to thereby combine the retaining body, the locking body, and the elastic member.

6. The wheelchair in accordance with claim 5, wherein the elastic member has a first end secured on a distal end of the guide pin and a second end urged on the first side of the locking body, whereby the retaining body is pulled to move outwardly relative to the locking body and compress the elastic member, the retaining body being moved toward the locking body by restoring force of the elastic member.

* * * * *